US008121319B2

(12) United States Patent
Azizi et al.

(10) Patent No.: US 8,121,319 B2
(45) Date of Patent: Feb. 21, 2012

(54) TRACKING SYSTEM USING AUDIO SIGNALS BELOW THRESHOLD

(75) Inventors: Seyed-Ali Azizi, München (DE); Tobias Münch, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1074 days.

(21) Appl. No.: 12/013,943

(22) Filed: Jan. 14, 2008

(65) Prior Publication Data

US 2008/0170730 A1  Jul. 17, 2008

(30) Foreign Application Priority Data

Jan. 16, 2007 (EP) ..................................... 07000806

(51) Int. Cl.
*H04R 5/02* (2006.01)
(52) U.S. Cl. ........ 381/310; 381/306; 381/307; 381/309; 381/73.1; 381/74
(58) Field of Classification Search .................. 381/306, 381/307, 309, 310, 73.1, 74
See application file for complete search history.

(56) References Cited

U.S. PATENT DOCUMENTS

| | | | | |
|---|---|---|---|---|
| 3,962,543 A | * | 6/1976 | Blauert et al. | 381/310 |
| 5,181,248 A | * | 1/1993 | Inanaga et al. | 381/310 |
| 5,452,359 A | * | 9/1995 | Inanaga et al. | 381/310 |
| 5,459,790 A | * | 10/1995 | Scofield et al. | 381/310 |
| 5,495,534 A | * | 2/1996 | Inanaga et al. | 381/310 |
| 5,708,719 A | * | 1/1998 | Greenberger et al. | 381/18 |
| 6,021,205 A | * | 2/2000 | Yamada et al. | 381/310 |
| 6,021,206 A | * | 2/2000 | McGrath | 381/310 |
| 6,069,585 A | * | 5/2000 | Lanciaux | 342/443 |
| 6,108,430 A | * | 8/2000 | Kurisu | 381/310 |
| 6,118,875 A | * | 9/2000 | Møller et al. | 381/1 |
| 6,343,130 B2 | * | 1/2002 | Yamazaki | 381/309 |
| 6,614,912 B1 | * | 9/2003 | Yamada et al. | 381/310 |
| 6,947,569 B2 | * | 9/2005 | Yamada et al. | 381/310 |
| 6,975,731 B1 | * | 12/2005 | Cohen et al. | 381/74 |
| 7,065,222 B2 | * | 6/2006 | Wilcock | 381/310 |
| 7,095,865 B2 | * | 8/2006 | Katayama et al. | 381/309 |
| 7,260,221 B1 | * | 8/2007 | Atsmon | 380/247 |
| 7,272,073 B2 | * | 9/2007 | Pellegrini et al. | 367/124 |
| 7,415,123 B2 | * | 8/2008 | Ballas | 381/309 |
| 7,460,991 B2 | * | 12/2008 | Jones et al. | 704/211 |

(Continued)

FOREIGN PATENT DOCUMENTS

EP  1176848 A2  1/2002

(Continued)

OTHER PUBLICATIONS

Vallidis, N.: Dissertation titled: "Whisper: A Spread Spectrum Approach to Occlusion in Acoustic Tracking," Chapel Hill 2002. 112 pages.

(Continued)

*Primary Examiner* — David S. Warren

(57) ABSTRACT

A tracking system may determine the orientation or position of a movable object. The tracking system includes a signal generator that generates a non-audible detection signal in an audible frequency range. A transmitting device transmits the detection signal to a detection device. The transmitting device or the detection device may be positioned on the movable object, and the other may be positioned at a remote location. A processor may determine an orientation or position of the moveable object based on the transmission time between the transmitting device and the detection device.

25 Claims, 7 Drawing Sheets

U.S. PATENT DOCUMENTS

| | | | |
|---|---|---|---|
| 7,480,692 B2 * | 1/2009 | Atsmon et al. | 709/200 |
| 7,482,951 B1 * | 1/2009 | Brungart et al. | 340/975 |
| 7,502,477 B1 * | 3/2009 | Inanaga et al. | 381/17 |
| 7,693,287 B2 * | 4/2010 | Eggert et al. | 381/17 |
| 7,864,632 B2 * | 1/2011 | Pfaffinger | 367/124 |
| 7,936,887 B2 * | 5/2011 | Smyth | 381/74 |
| 7,941,480 B2 * | 5/2011 | Atsmon et al. | 709/202 |
| 8,027,477 B2 * | 9/2011 | Wang | 381/17 |
| 2002/0025054 A1 * | 2/2002 | Yamada et al. | 381/310 |
| 2003/0031334 A1 * | 2/2003 | Layton et al. | 381/310 |
| 2003/0059070 A1 * | 3/2003 | Ballas | 381/309 |
| 2003/0086573 A1 * | 5/2003 | Schobben et al. | 381/74 |
| 2003/0190047 A1 * | 10/2003 | Aarts | 381/310 |
| 2003/0210800 A1 * | 11/2003 | Yamada et al. | 381/310 |
| 2004/0022392 A1 * | 2/2004 | Griesinger | 381/18 |
| 2004/0076301 A1 * | 4/2004 | Algazi et al. | 381/17 |
| 2004/0105550 A1 * | 6/2004 | Aylward et al. | 381/17 |
| 2004/0156512 A1 * | 8/2004 | Parker | 381/74 |
| 2005/0047618 A1 * | 3/2005 | Davis et al. | 381/309 |
| 2005/0047619 A1 * | 3/2005 | Murata et al. | 381/309 |
| 2005/0147261 A1 * | 7/2005 | Yeh | 381/92 |
| 2005/0152565 A1 * | 7/2005 | Jouppi et al. | 381/309 |
| 2005/0213528 A1 * | 9/2005 | Aarts et al. | 370/315 |
| 2005/0249367 A1 * | 11/2005 | Bailey | 381/310 |
| 2005/0276419 A1 * | 12/2005 | Eggert et al. | 381/17 |
| 2006/0045294 A1 * | 3/2006 | Smyth | 381/309 |
| 2006/0136544 A1 * | 6/2006 | Atsmon et al. | 709/200 |
| 2007/0009120 A1 * | 1/2007 | Algazi et al. | 381/310 |
| 2007/0165890 A1 * | 7/2007 | Fusakawa et al. | 381/309 |
| 2008/0056517 A1 * | 3/2008 | Algazi et al. | 381/310 |
| 2008/0130408 A1 * | 6/2008 | Pfaffinger | 367/13 |
| 2008/0170730 A1 * | 7/2008 | Azizi et al. | 381/310 |
| 2008/0205675 A1 * | 8/2008 | Kutuzov et al. | 381/309 |
| 2009/0034766 A1 * | 2/2009 | Hamanaka et al. | 381/310 |
| 2009/0067291 A1 * | 3/2009 | Atsmon et al. | 367/118 |
| 2010/0030838 A1 * | 2/2010 | Atsmon et al. | 709/200 |
| 2010/0128887 A1 * | 5/2010 | Lee et al. | 381/74 |
| 2010/0208631 A1 * | 8/2010 | Zhang et al. | 370/297 |
| 2010/0246847 A1 * | 9/2010 | Johnson et al. | 381/74 |
| 2011/0026745 A1 * | 2/2011 | Said et al. | 381/310 |
| 2011/0182445 A1 * | 7/2011 | Atsmon et al. | 381/123 |

FOREIGN PATENT DOCUMENTS

| | | |
|---|---|---|
| EP | 1 359 437 A | 11/2003 |
| WO | WO 92/07346 | 4/1992 |
| WO | WO 01/10065 A1 | 2/2001 |
| WO | WO 01/34264 A1 | 5/2001 |
| WO | WO 2004/057361 A | 7/2004 |
| WO | WO 2005/032209 A2 | 4/2005 |

OTHER PUBLICATIONS

E. Zwicker, "Psychoakustik," Springer-Verlag 1982. p. 31-45.

E. Zwicker, M. Zollner, "Elektroakustik," Springer-Verlag 1984. p. 36-39, 231-236.

* cited by examiner

TRACKING SYSTEM USING AUDIO SIGNALS BELOW THRESHOLD

PRIORITY CLAIM

This application claims the benefit of priority from European Patent Application No. 07000806.5, filed Jan. 16, 2007, which is incorporated by reference.

BACKGROUND OF THE INVENTION

1. Technical Field

This application relates to tracking systems and, more particularly, to determining the spatial orientation of a moveable object.

2. Related Art

Many applications use surround sound techniques to enhance the quality of audio playback for listeners. The perception of surround sound reproduced from audio data may be based on the principles that listeners use to locate sound sources in space in every day life. Namely, sound signals from a particular sound source may arrive at the ears of a listener at different times and with other non-uniformities. Additionally, the human ear influences the frequency of incoming sound signals dependent on the direction of the incoming signal.

When a listener experiences surround sound from loudspeakers, the listener receives both direct sound from each loudspeaker and multiple reflections. By the time sound reaches the listener, the sound from each speaker has acquired a unique signature. These signatures cue the brain as to the size and acoustical properties of the room, the location of the loudspeakers, and the spatial properties of the original sound.

If, however, the listener experiences a surround sound reproduction through a headphone unit, then the effects of amplitude and phase shifting as well as frequency filtering may be eliminated. Without these effects, the listener may be unable to locate the position of various sound sources. Rather, the sound sources are located directly at both ears. Another drawback occurs in the situation where the head of a person turns while listening to simulated surround sound via headphones. The simulated sound field turns together with the head and seems the same to the listener regardless of the orientation of the listener's head. Therefore, the listener will not have a true surround sound experience.

Some systems attempt to overcome this drawback by tracking the movement of the head of the listener. These systems use head tracking information and additional pre-processing to reflect the movements of the head in the sound data fed to the headphones. Some head tracking systems include a measurement device. Others include transmitters. In both systems, a large amount of hardware may be required. Therefore, a need exists for an improved tracking system with a reduced hardware effort.

SUMMARY

A tracking system may determine the orientation or position of a movable object. The tracking system includes a signal generator that generates a non-audible detection signal in an audible frequency range. A transmitting device transmits the detection signal to a detection device. The transmitting device or the detection device may be positioned on the movable object, and the other may be positioned at a remote location. A processor may determine an orientation or position of the moveable object based on the transmission time between the transmitting device and the detection device.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A tracking system may determine the orientation or position of a movable object. To determine the orientation or position of a movable object, the tracking system uses one or more detection signals transmitted between one or more transmitters and one or more detectors. The transmitter or the detector may be fixed to the movable object while the other (e.g., the transmitter or the detector) may be located at a remote position. The tracking system may determine the orientation or position of the movable object based on a propagation time between the transmitters and detectors. The detection signals may be audio signals. In some systems, the detection signals may be non-audible sonic signals in an audible frequency range. The signals may be detectable by measurement technology, such as a microphone or other detection device. A microphone may detect sonic signals that have signal levels below the threshold of human hearing.

The tracking system may couple or interface an audio system. The audio system may comprise a headphone unit simulating surround sound. In alternative systems, the tracking system may interface with or comprise a portion of a vehicle entertainment system reproducing a multi-channel sound source, a teleconferencing system, a computer system generating 3D-sound (e.g. in connection with computer games), or a home audio/video system.

In an audio system, the use of audio signals for tracking may reduce the hardware needed and the costs of a tracking system. The hardware used by the tracking system may be the same kind used to produce audible sound. Non-audible audio signals may be generated by a digital signal processor (DSP). A DSP may be capable of generating a plurality of signals having various frequencies, forms, and amplitudes. The loudspeakers used in an audio system may serve as the transmitters of the tracking system. The loudspeakers may be in a vehicle, an entertainment system, or coupled to a computer. Additionally, the costs for the detectors may be relatively low as microphones may be the detectors used in the tracking system.

Due to psychoacoustic effects of the hearing process, not all sounds may be perceived by a person, even in the audible frequency range where listeners are generally able to perceive sonic signals. The perception of sonic signals by a human being may be restricted to a sound frequency domain from approximately 20 Hz to approximately 20 kHz. However, not every sonic signal within this range may be perceived by a person through their hearing. A certain sound level of a sonic signal may be required for a person to perceive the signal. The sound level defining the perceivability of a sonic signal in the case where only a single sonic signal exists may be known as an "absolute threshold of hearing" or "threshold in quiet." The absolute threshold of hearing may depend on the frequency of the tone to be perceived.

Figure 1:
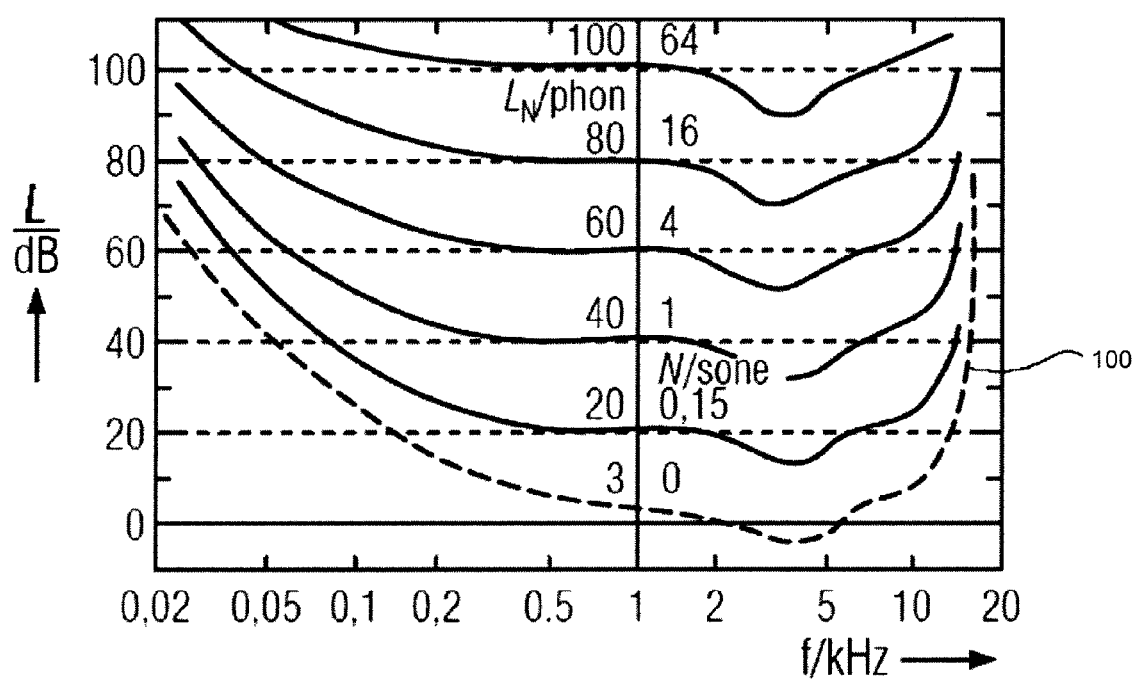
FIG. 1 illustrates an absolute threshold of hearing of an average person.

The dashed curve 100 in FIG. 1 illustrates the absolute threshold of hearing as a function of tone frequency. The ordinate axis graded in decibel shows the sound level. As seen in FIG. 1, the human ear achieves the highest perceivability for sound in the frequency range between about 2 and about 5 kHz. The absolute threshold of hearing moderately increases for frequencies below about 1 kHz, and drastically increases for frequencies larger than about 10 kHz (the abscissa of FIG. 1 is based on the logarithmic frequency scale).

Sonic signals below the absolute threshold of hearing in the sound level-frequency plane of FIG. 1 may not be perceivable. The dashed curve 100 shown in FIG. 1 illustrates the absolute threshold of hearing of an average person. The absolute threshold of hearing of various individuals may deviate above or below the dashed curve 100.

The additional curves in FIG. 1 that are illustrated above the absolute threshold are curves of equal loudness. These curves are based on psychoacoustic experiments and show the sound level of a tone that is perceived by the average person as having the same loudness. The curves are parameterized by the loudness level (symbol $L_N$) measured in the unit "phon." The loudness level in phon equals the sound level in decibel of a tone at a frequency of about 1 kHz that is perceived as having the same loudness. As the absolute threshold of hearing at a frequency of f=1 kHz equals L=3 dB, the absolute threshold of hearing corresponds to the parameter value of $L_N$=3 phon. An alternative parameterization of the curves of equal loudness level is shown on the right hand side of FIG. 1. Parameter N is called loudness and more appropriately reflects human perception. The loudness of the absolute threshold of hearing corresponds to N=0.

As sonic signals having a sound level below the absolute threshold of hearing may not be perceived, these signals may be appropriate for use as detection signals for the tracking system. In some situations, the tracking system may use detection signals in the frequency ranges where the absolute threshold of hearing is comparably high. These frequency ranges may be outside the central area of the frequency axis shown in FIG. 1. The sound level of a detection signal in these frequency ranges may be relatively large compared to the central frequency range (from about 500 Hz to about 10 kHz). Therefore, relatively intensive signals may be employed in this range. Because the signals in this range may have a higher sound level while remaining below threshold, the reliability of detection may be increased. In other situations, the tracking system may use detection signals in the frequency ranges where the absolute threshold of hearing is comparably low. These frequency ranges may be near the central area of the frequency axis shown in FIG. 1.

Under certain circumstances, a sonic signal having a sound level above the absolute threshold of hearing may be non-audible and may therefore be used as a detection signal for the tracking system. Such a situation may be caused by a psychoacoustic effect called "masking." When the detection signal is transmitted in a quite environment, the detection signal may be at a relatively low audio level to be non-audible. Alternatively, when the detection signal is transmitted in a relatively loud environment, the detection signal may be louder and still remain non-audible. In this situation, the detection signal is masked by the other audible sounds. Specifically, the threshold for hearing is increased by the other audible sounds.

A masked threshold of hearing represents a quantitative indicator for audibility under a condition of masking. The masked threshold of hearing indicates the sound level of a test sound (e.g., a pure sine test tone) that is just audible together with the disturbing sound. The form and location of the masked threshold of hearing in the sound level-frequency plane depends on the acoustic properties of the disturbing sounds. FIGS. 2 to 5 illustrate a plurality of examples of masked thresholds of hearing caused by different disturbing sounds. In FIGS. 2 to 5, the masked threshold of hearing may be above the absolute threshold of hearing represented by the dashed line 100 in FIGS. 2 to 5. In frequency areas where the disturbing sound does not have frequency components, the masked threshold of hearing passes into the absolute threshold of hearing. In other areas, the masked threshold of hearing is higher than the absolute threshold of hearing.

Figure 2:
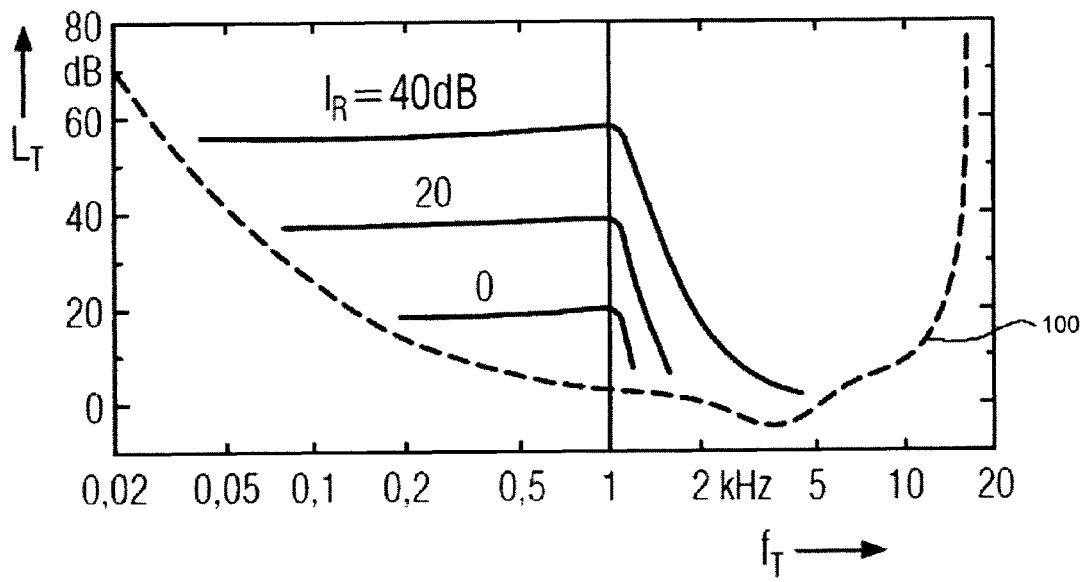
FIG. 2 illustrates a first masked threshold of hearing.
Figure 3:
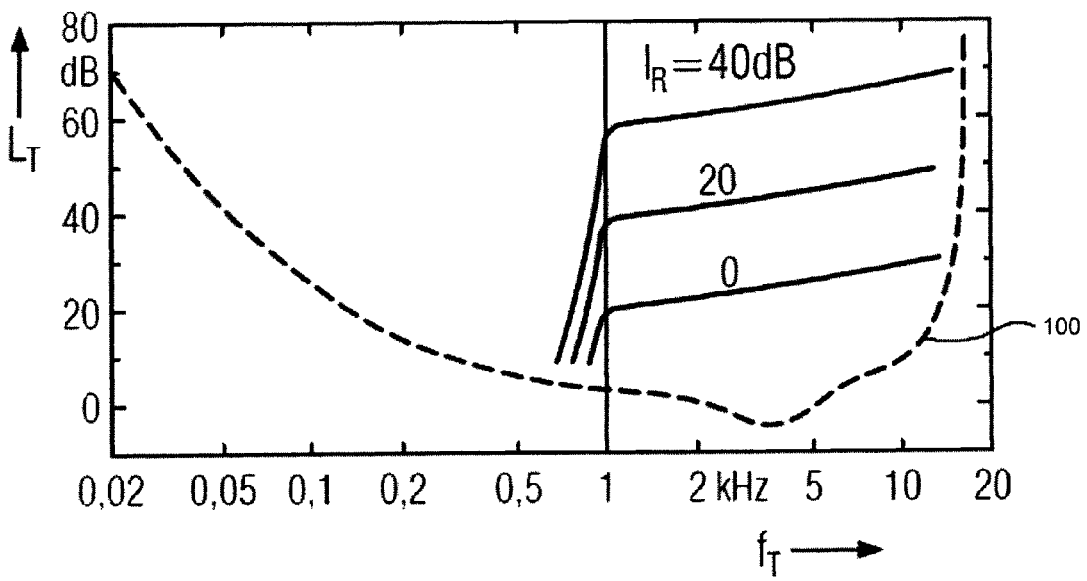
FIG. 3 illustrates a second masked threshold of hearing.

FIG. 2 illustrates the masked threshold of hearing in an environment with a low frequency noise. The disturbing noise of FIG. 2 is obtained by applying a lowpass filter with a threshold frequency of about 1 kHz to white noise. The three curves shown above the dashed line 100 are parameterized by density levels of respective noise. A similar example is shown in FIG. 3 where the masked thresholds of hearing for high pass noise are obtained by applying a high pass filter with a threshold frequency of about 1 kHz to white noise.

The effect of noise masking may be applied to the use of sonic signals in the audible frequency range as detection signals in the tracking system. The tracking system may be used in a noisy environment, such as a vehicle. In a vehicle, noise may be generated by a superposition of different sound sources that occur in the vehicle. Due to the effect of masking, even a detection signal above the absolute threshold of hearing may be used as non-audible detection signal for the tracking system.

Figure 4:
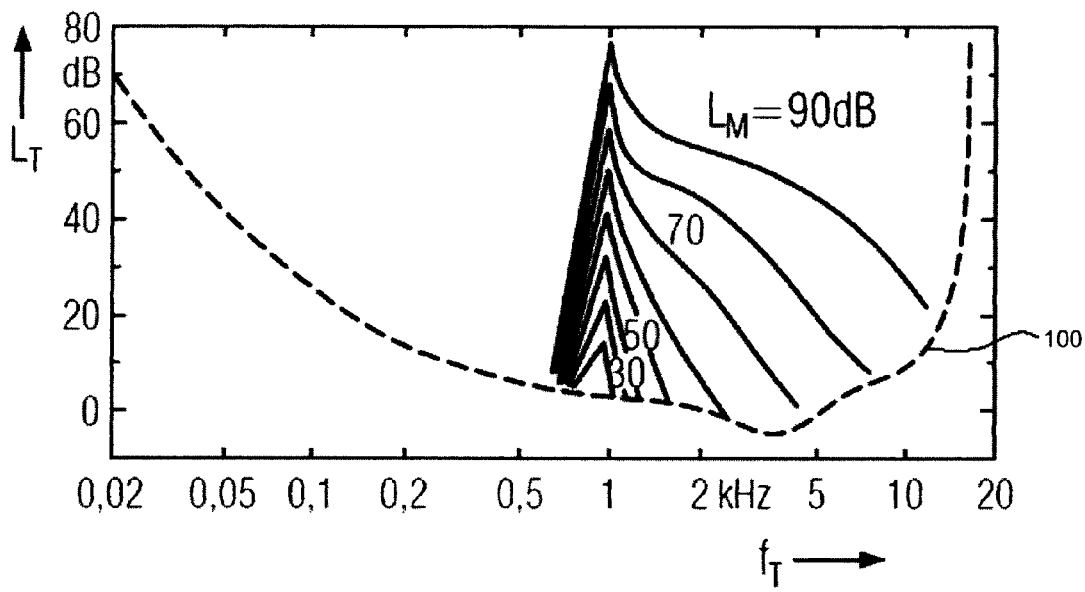
FIG. 4 illustrates a third masked threshold of hearing.

The effect of masking occurs not only under the condition of noise, but a masked threshold of hearing also exists when other audible tones and sounds are present. FIG. 4 illustrates the masked threshold of hearing for pure sine tones having a frequency of about 1 kHz. The curves shown in the diagram above the dashed line 100 are parameterized by a sound level LM. However, many natural sounds are not pure tones (having the form of a pure sine wave), but are composed from a large plurality of harmonics. The masked threshold of hearing is considerably influenced by the amplitudes and sound levels of the harmonics forming a disturbing sound.

Figure 5:
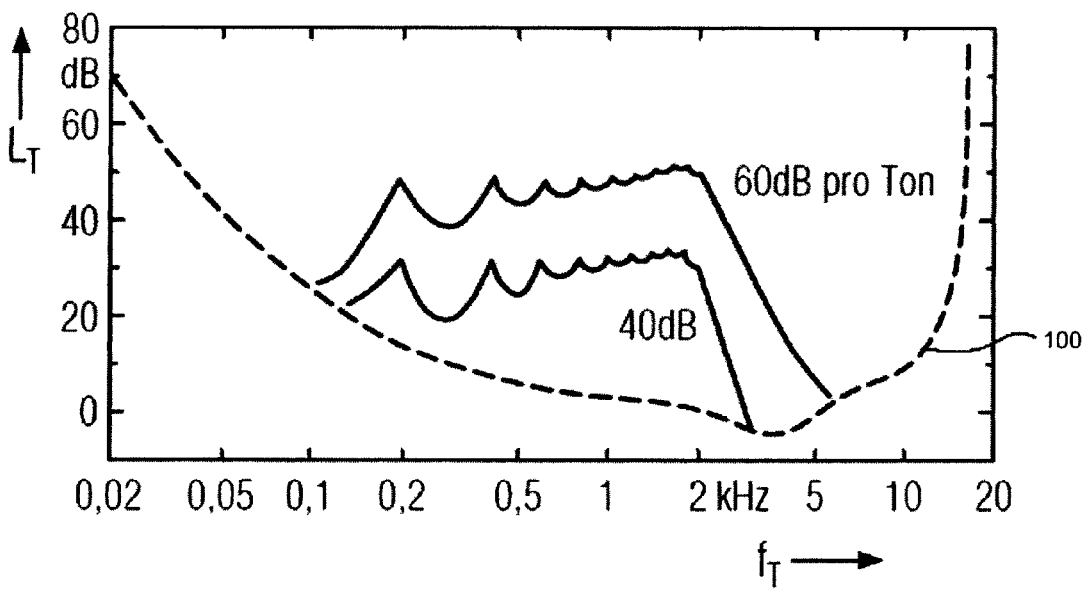
FIG. 5 illustrates a fourth masked threshold of hearing.

FIG. 5 illustrates two curves of masked thresholds of hearing for a tone of 200 Hz with 10 harmonics, where all harmonics have the same amplitude, but where the phase of the harmonics is statistically distributed. The two different curves in the diagram of FIG. 5 illustrate two cases, where the constituent tones have sound levels of about 40 and about 60 dB, respectively, while in the illustrated case (a pure tone with harmonics) at least in the lower frequency range (on the logarithmic frequency scale) the individual frequencies of constituent harmonics of the masking sounds may be distinguished as peaks of the masked threshold of hearing. The masked threshold of hearing becomes more flat if the masking sound has a more complex structure (such as an accord or even more complex kind of sound).

The effect of masking by sound may be used in a situation where loudspeakers of an audio system are used to contemporaneously transmit audible sound and a detection signal for the tracking system. The form of the masked threshold of hearing depends on characteristic features of the masking sound. So the detection signal may be formed based on the characteristic features of the masking sound, the signal generator for generating the detection signal may be connected to an output of the amplifier that generates the masking sound signal. The signal generator may use the output of the amplifier to determine the characteristic features of the masking sound. In this case, the signal generator may comprise an additional unit to determine the frequency dependent masked threshold of hearing for the current sound conditions. The signal generator determines the threshold on the basis of the sound characteristics input from the amplifier (in particular, the amplitude and phase distribution of the frequency constituents composing the currently output sound). The signal generator of the tracking system may then select optimal frequency and amplitude parameters for a detection signal to be generated. The signal generator may select the frequency and amplitude parameters of the detection signal to ensure it will be inaudible, while also ensuring it has sufficient amplitude to be detected by a detection device.

The effect of masking may be based on the psychoacoustic properties of the human hearing process, and may not apply to the detector. Therefore, an inaudible detection signal in the audible frequency range may be employed for transmission time measurements without causing any disturbance to the perception of audio signals transmitted simultaneously. For more details regarding the absolute threshold of hearing and the phenomenon of masking, see the textbooks E. Zwicker, M. Zollner, "Elektroakustik," Springer-Verlag 1984 and E. Zwicker, "Psychoakustik," Springer-Verlag 1982. FIG. 1 has been reproduced from the first, and FIGS. 2 to 5 have been reproduced from the second mentioned textbook.

Figure 6:
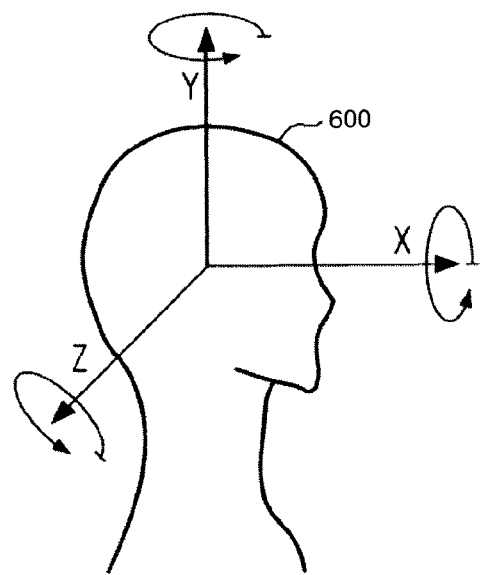
FIG. 6 illustrates six degrees of freedom of motion of a three-dimensional moveable object.

FIG. 6 illustrates six degrees of freedom of a three-dimensional object 600 (in this case a human head, which may be a head wearing headphones for simulating surround sound). The illustrated six degrees of freedom comprise three degrees of freedom of translation and three degrees of freedom of rotation. The three degrees of freedom of translation correspond to the components of movement of the moveable object as a whole along the directions of three axes in space that are perpendicular to each other. These axes are designated as X, Y, and Z, respectively in FIG. 6. As indicated by the ring shaped arrows in FIG. 6, three rotational degrees of freedom correspond to a rotation of the moveable object as a whole around one of the three fixed axes X, Y, and Z. Rotation around the X axis may be called pitch, rotation around the Y axis may be called yaw, and rotation about the Z axis may be called roll. Accordingly, in the example of FIG. 6 yaw rotation corresponds, for instance, to spinning in a swivel chair, pitch rotation corresponds, for instance to nodding from side to side, and roll rotation corresponds to nodding the head back and forth.

The rotation of a moveable object may be composed from a superposition of rotations around three fixed orthogonal axes. Therefore, six degrees of freedom of motion described by six parameters are sufficient to completely describe motion of a three dimensional object. Many parameters may describe the orientation and position of a moveable object. In some systems, the overall number of independent parameters may not exceed six. In some systems, motion may be further restricted or may be assumed to be restricted in a sufficiently good approximation, such that the actual number of degrees of freedom and respective number of parameters may be further reduced.

Figure 7:
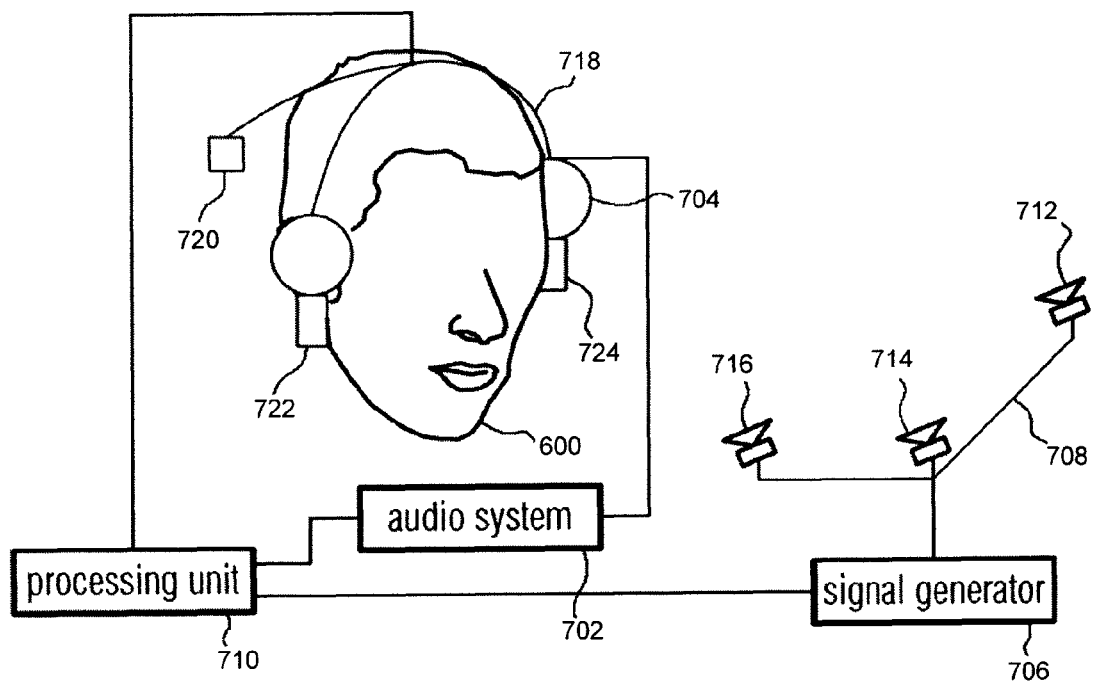
FIG. 7 illustrates a tracking system employed in an audio system.

FIG. 7 illustrates a tracking system in communication with an audio system 702. The audio system 702 is coupled with a headphone unit 704 worn by a user 600. The headphone unit 704 comprises a moveable object to be tracked by the tracking system. The audio system 702 further comprises other components, such as a receiving unit, CD/DVD recording and reproduction devices, an amplifier, and loudspeakers. However, the audio system 702 may include more or fewer components. For instance, the audio system 702 may be combined with one or more video components, such as video display devices.

The tracking system comprises a signal generator 706, a transmitting device 708, and a processing unit 710. The transmitting device 708 may comprise a single transmitter. Alternatively, the transmitting device 708 may comprise a plurality of transmitters. The transmitting device 708 may comprise three transmitters 712, 714, and 716 positioned in a triangular arrangement. However, more or fewer transmitters may be used. Depending on the degrees of freedom to be measured, one or more transmitters may be used. The tracking system also includes a detection device 718. The detection device 718 may comprise a single detector. Alternatively, the detection device 718 may comprise a plurality of detectors. The detection device 718 may comprise three detectors 720, 722, and 724 positioned in a triangular arrangement. However, more or fewer detectors may be used. Depending on the degrees of freedom to be measured, one or more detectors may be used. In FIG. 7, both the transmitting device 708 and the detection device 718 are connected to the processing unit 710 for time synchronization and measurement.

The number of transmitters and detectors used in the tracking system may depend on the number of geometrical parameters that identify the orientation and position of the moveable object to be tracked. Three transmitters and three detectors may allow complete determination of the orientation and spatial position of a three dimensional moveable object. When fewer parameters are needed, then the number of parameters and the respective number of detectors and transmitters decrease. A similar situation occurs where certain parameters are considered to be less important. The number of transmitters and detectors used by the tracking system depends on the number of degrees of freedom of a moveable object that is to be tracked. If a single orientation parameter is relevant, then a single transmission time measurement may be sufficient. In that situation, the tracking system may use only a single transmitter and a single detector. Such a configuration may be used in a situation where a user wearing headphones to be tracked is sitting at a fixed position (such as in an armchair or in a seat of a vehicle), but the user's head turns from time to time. In this situation, the tracked orientation parameter may be a rotation angle around a vertical axis of the head.

The signal generator 706 may generate a single detection signal or a plurality of detection signals. A detection signal may be constructed by superposition of sonic signals that are non-audible for a human being in view of the psychoacoustic concepts described above. Accordingly, the detection signals may be constructed from such partial sonic signals that have spectra in the audible frequency domain below the respective threshold of hearing. The signal generator 706 of the tracking system may generate detection signals that are below the absolute threshold of hearing (e.g., the dashed curve 100 in FIGS. 1 to 5). However, the sound level of sonic signals below the absolute threshold of hearing may be low. Therefore, the signal generator 706 may alternatively generate detection signals that are below the masked threshold of hearing. If the detection signal is masked by other sound fields existing in space, it is sufficient for the detection signal to be generated by the signal generator 706 so that the spectra of the detection signals are situated below the current masked threshold of hearing. The masked threshold of hearing is generally higher than the absolute threshold of hearing. Therefore, when using the masked threshold of hearing, the signal generator 706 may produce detection signals at a higher sound level. Producing the detection signals at a higher sound level may increase detection reliability.

The generated detection signal may have an arbitrary shape. The shape of the detection signal may comprise a clearly detectable peak. Such a peak helps to indicate an exact time of transmission and an exact time of detection. The tracking system may employ a correlation technique to measure the transmission time. In the case where the transmitting device 708 comprises a plurality of transmitters 712, 714, and 716, the transmitters 712, 714, and 716 output detection signals in a manner so that they may be distinguished from each other. This may be achieved, for instance, by employing different frequency ranges or by employing specifically encoded digital signals. Alternatively, subsequent transmission in the time domain is possible.

Individual detection signals transmitted by individual transmitters 712, 714, and 716 are individually detected by detectors 720, 722, and 724. In FIG. 7, a maximum of nine individual transmission times may be measured (e.g., from each of the three transmitters to each of the three detectors). As the positions of the transmitters 712, 714, and 716 are assumed to be fixed in a predetermined space, the processing unit may be capable of determining the position and orientation of the moveable object 600 with respect to the predetermined space as described in FIGS. 10 to 13.

The transmitting device 708 may be fixed within a predetermined space to determine the orientation and position of a moveable object within that predetermined space. The space may be, for instance, a room or the interior of a vehicle. In FIG. 7, the detection device 718 is coupled to the headphone unit 704 while the transmitting device 708 is shown in a fixed location remote from the headphone unit 704. Such an arrangement may be used in a situation where the tracking system uses the loudspeakers of an existing audio system to serve as transmitters. Alternatively, due to the reciprocity of transmission sonic of signals, the transmitting device 708 could be fixed to the headphone unit 704 while the detection device 718 is placed in a fixed location remote from the headphone unit 704. For instance, such an arrangement may be used in a situation where the tracking system is monitoring a plurality of moveable objects in a predetermined space. Each of the moveable objects being tracked may be distinguished by specific detection signals. For instance, each of the moveable objections could transmit different detection signals.

Figure 8:
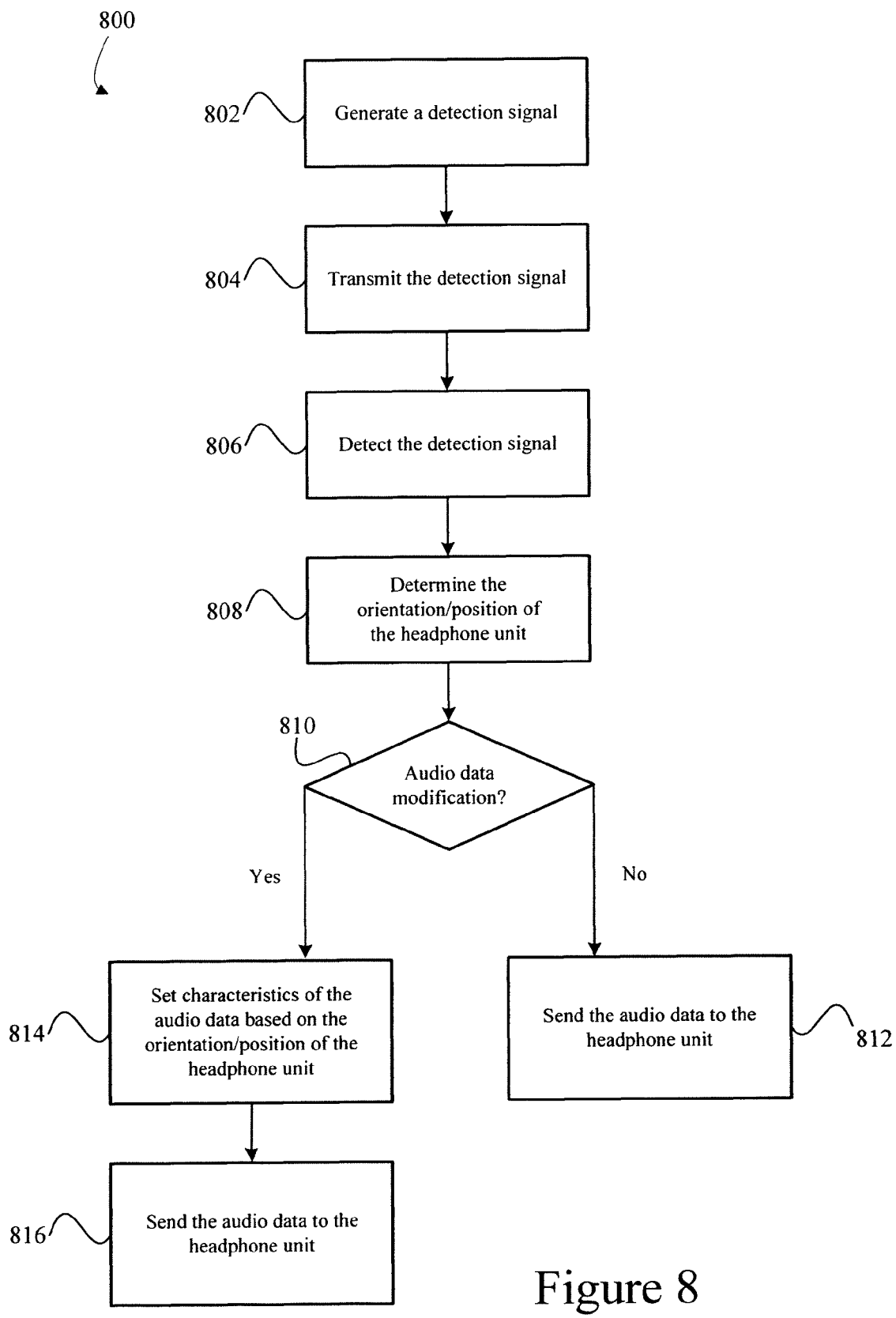
FIG. 8 is a method of using an audio signal below threshold to track a headphone unit.

FIG. 8 is a method of using an audio signal below threshold to track a headphone unit. Logic 800 illustrates various acts that may be performed by the tracking system components illustrated in FIG. 7. At act 802, a detection signal is generated. The signal generator 706 may generate the detection signal. The detection signal comprises a non-audible sonic signal in an audible frequency range. The signal generator 706 may pass the detection signal to the transmitting device 708. At act 804, the detection signal is transmitted. The transmitting device 708 may transmit the detection signal generated by the signal generator 706. Because the detection signal is an audio signal, the transmitting device may be a loudspeaker. At act 806, the detection signal is detected. The detection device 718 may detect the detection signal transmitted by the transmitting device 708.

At act 808, the orientation/position of the headphone unit 704 is determined. The processing unit 710 may receive information related to the transmission time of the detection signal between the transmitting device 708 and the detection device 718. When determining transmission times, the tracking system may use a presumption of a preset sound velocity value. Alternatively, the tracking system may use a transmitter/detector pair to determine the current sound velocity value achieved in the area of operation of the tracking system. The processing unit 710 uses the transmission time information and the sound velocity information to determine the orientation and/or position of the headphone unit 704.

The headphone unit 704 may be configured to simulate a surround sound reproduction of audio data for a wearer of the headphone unit 704. At act 810, it is determined whether to modify the audio data based on the detected orientation/position of the headphone unit 704. The processing unit 710 may determine whether to modify one or more characteristics of the audio data based on the tracked position and/or orientation of the headphone unit 704. If the processing unit 710 decides not to modify the audio data based on the tracked position and/or orientation of the headphone unit 704, then logic 800 proceeds to act 812. This may be the case where the processing unit 710 determines that the headphone unit 704 has not changed its orientation or position since the last tracked orientation/position. This may also be the case where any detected change is negligible. At act 812, the audio data (without new modifications based on position/orientation) is sent to the headphone unit 704. The processing unit 710 may send the audio data to the headphone unit 704.

Alternatively, if at act 810 the processing unit 710 decides to modify the audio data based on the tracked position and/or orientation of the headphone unit 704, then logic 800 proceeds to act 814. At act 814, characteristics of the audio data are set based on the orientation/position of the headphone unit 704. The processing unit 710 may use the tracked position and/or orientation of the headphone unit 704 to modify the audio data for the headphone unit 704. Specifically, the processing unit 710 may adjust the amplitude, shift the phase, or make some other modification to the audio data for one or both speakers of the headphone unit 704.

The processing unit 710 may modify the audio data to be sent to the headphone unit 704 in a way to simulate the natural effects that would occur if the listener was to change head position or orientation in a space with a surround sound field. As a first illustration, consider the situation where a listener is facing a sound source, such as a loudspeaker in a room. When the head of the listener turns to the left, the listener will detect that the sound source is now on the listener's right side. As a second illustration, consider the situation where a listener is facing a video screen with associated audio content. When the listener moves from a central position in front of the video screen to a position to one side of the video screen, the listener expects an amendment of the perceived sound characteristics.

The processing unit 710 may simulate these effects through headphones by modifying the audio data to be sent to the headphone unit 704 based on the detected position/orientation of the headphone unit 704 (which corresponds to the position/orientation of the wearer of the headphone unit 704). Specifically, where the headphone unit 704 produces a surround sound simulation for a wearer of the headphone unit 704, the headphone unit 704 may produce a virtual sound source within a virtual sound field. When the headphone unit 704 turns or changes position, the processing unit 710 may modify the audio data to reflect a corresponding change to the listener's spatial orientation relative to the virtual sound source. In one instance, the headphone unit 710 turns to the left (indicating that the wearer turned to the left) and the processing unit 710 modifies the audio data to be sent to the headphone unit 710 so that the virtual sound source appears to be on the right side of the wearer. After the position/orientation based modifications to the audio data have been made at act 814, the modified audio data is sent to the headphone unit 704 for presentation to the wearer at act 816.

Figure 9:
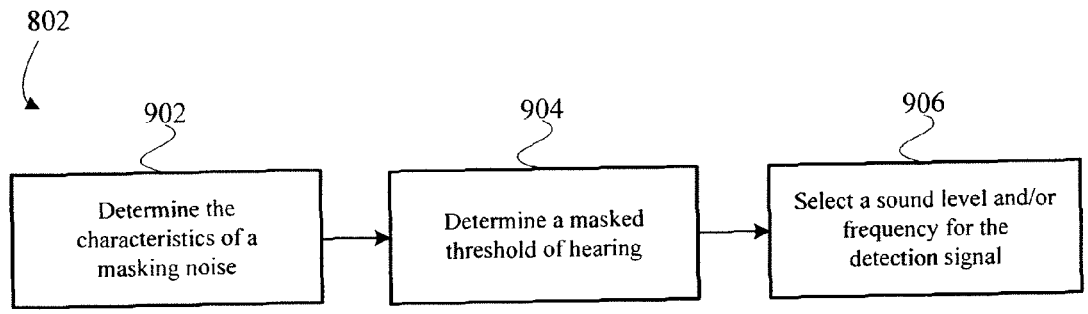
FIG. 9 is a method of selecting a sound level and/or frequency for the audio signal used in the method of FIG. 8.

FIG. 9 is a method of selecting a sound level and/or frequency for the audio signal used in the method of FIG. 8. Specifically, FIG. 9 illustrates additional functionality that may be included at act 802 of FIG. 8. At act 902, the characteristics of a masking noise in the vicinity of the tracking system may be determined. If masking occurs due to general environmental sounds (noise), then the signal generator 706 may be equipped with a noise detection unit and an internal or external evaluating unit (such as the processing unit 710). Alternatively, if the masking occurs due to sound generated by the audio system 702 and emitted by loudspeakers, then the signal generator 706 may receive the characteristics of the masking sound from the audio system 702. Specifically, the signal generator 706 may receive information of the masking sound from an amplifier that feeds the sound to the loudspeakers. In this case, the transmitting system may include an additional connection between the audio system 702 and the signal generator 706.

At act 904, a masked threshold of hearing may be determined. Where the masking sound is noise, the tracking system may determine the masked threshold of hearing on the basis of the properties of the detected noise. Where the masking sound is generated by the audio system, the tracking system may determine the masked threshold of hearing on the basis of the audio characteristics of the masking sound received from the audio system 102.

At act 906, the characteristics of the detection signal are selected to be below the determined masked threshold of hearing. The tracking system may select the frequency and/or sound amplitude level for the detection signal so that the detection signal may be detected while remaining inaudible.

Figure 10:
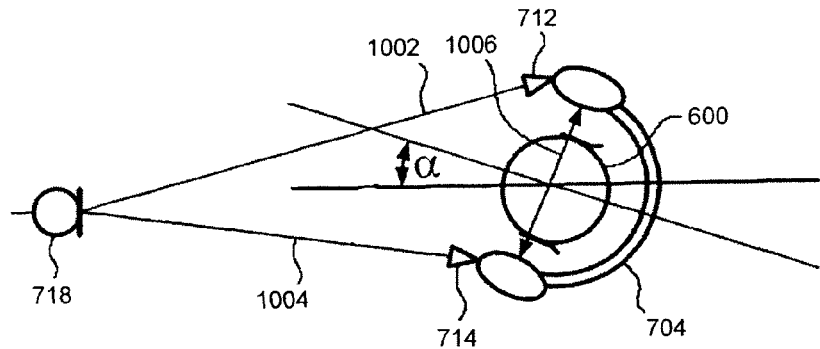
FIG. 10 is a first transmitter/detector configuration of a tracking system.

FIG. 10 illustrates the determination of a single orientation parameter a of a movable object. FIG. 10 schematically represents a head 600 wearing a headphone unit 704. The transmitters 712 and 714 are coupled to the headphone unit 704. The detector 718, such as a microphone for detecting a detection signal transmitted from either of the transmitters 712 and 714, is arranged in front of the person wearing the headphone unit 704. In the situation illustrated in FIG. 10 it may be assumed that the movement of the head of the person to be tracked is restricted to rotation around a single axis (perpendicular to the plane of the drawing). The tracking system measures the transmission time of a detection signal from the transmitter 712 to the detector 718 via path 1002 and the transmission time from transmitter 714 to detector 718 via path 1004. If the overall distance between the head 600 and detector 718 is known, then the current value of the sound velocity may be derived from the average of both measured transmission times. On the basis of the determined sound velocity, the distances 1002 and 1004 between the headphone unit and the detector 718 are determined on the basis of the measured transmission times. If the distance 1006 between the transmitters 712 and 714 is also known, then the orientation angle α may be determined by triangulation based on the distances 1002 and 1004.

Figure 11:
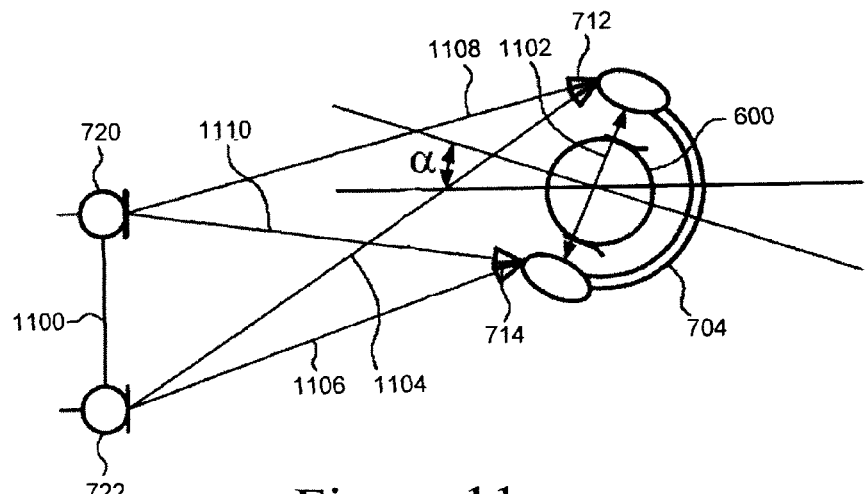
FIG. 11 is a second transmitter/detector configuration of a tracking system.

The configuration of FIG. 11 differs from the configuration of FIG. 10 in that the configuration of FIG. 11 comprises two detectors 720 and 722 instead of a single detector 718. The distance 1100 between the two detectors 720 and 722 may be known. The distance 1102 between the two transmitters 712 and 714 may also be known. The tracking system measures the transmission time of a detection signal between the transmitter 712 and the detector 722 via path 1104 and the transmission time of a detection signal between the transmitter 714 and the detector 722 via path 1106. The tracking system also measures the transmission times between both the transmitters 712 and 714 to the detector 720 via paths 1108 and 1110. The additional data available in the configuration of FIG. 11 allows a horizontal position coordinate (indicating the position of the head to be tracked along a line parallel to the connection 1100 between both detectors 720 and 722) to be additionally determined by triangulation.

If the current velocity of sound is known in advance, the configuration of FIG. 10 also allows the tracking system to determine a distance between moveable object 600 and the detector 718. In the same manner, if the current velocity of sound is known in advance, the configuration of FIG. 11 allows the tracking system to additionally determine a vertical position parameter of the moveable object 600.

Figure 12:
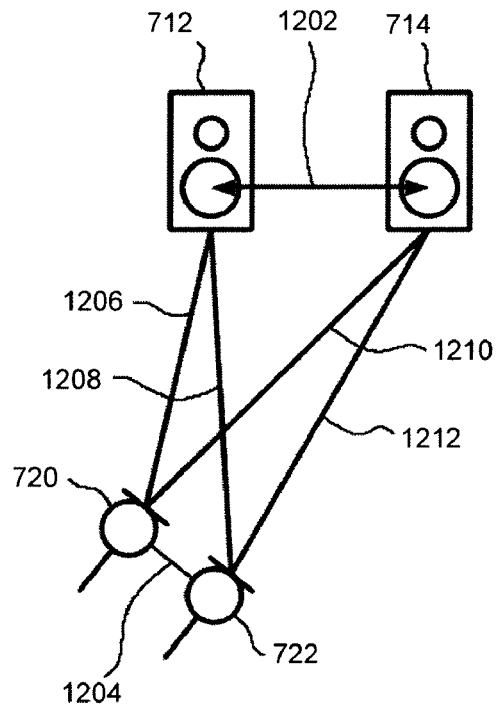
FIG. 12 is a third transmitter/detector configuration of a tracking system.

FIG. 12 illustrates an alternative to the configuration of FIG. 11. In the configuration of FIG. 12, the transmitters 712 and 714 are positioned in a fixed location remote from the moveable object, while the detectors 720 and 722 are fixed on the moveable object. The reciprocity property of sonic signals employed for detection allows the tracking system to use either the configuration of FIG. 12 or the configuration of FIG. 11. Accordingly, the predetermined distance 1202 between the transmitters 712 and 714 corresponds to the distance 1102 of FIG. 6. Also, the predetermined distance 1204 between detectors 720 and 722 corresponds to the distance 1100 of FIG. 11. The transmission paths 1206, 1208, 1210, and 1212 of FIG. 12 correspond to the respective transmission paths 1108, 1104, 1110, and 1106 of FIG. 11.

The configuration of FIG. 12 employs existing loudspeakers of an audio system as transmitters. Such a configuration may occur in a multimedia environment where different users enjoy different programs by using headphones and loudspeakers respectively. One user in the multimedia environment may be using the loudspeakers to listen to a first program, while another user is using headphones to listen to a second program. The loudspeakers used as transmitters may be the speakers inside a vehicle. Alternatively, the loudspeakers used as transmitters may be the speakers within a room.

Another configuration is possible where the existing loudspeakers are temporarily not used to emit sound, but the user still employs headphones for listening to a program. In this case, the existing loudspeakers may still be employed to emit the non-audible detection signal (for instance, a signal below the absolute threshold of hearing) without causing any disturbance.

Figure 13:
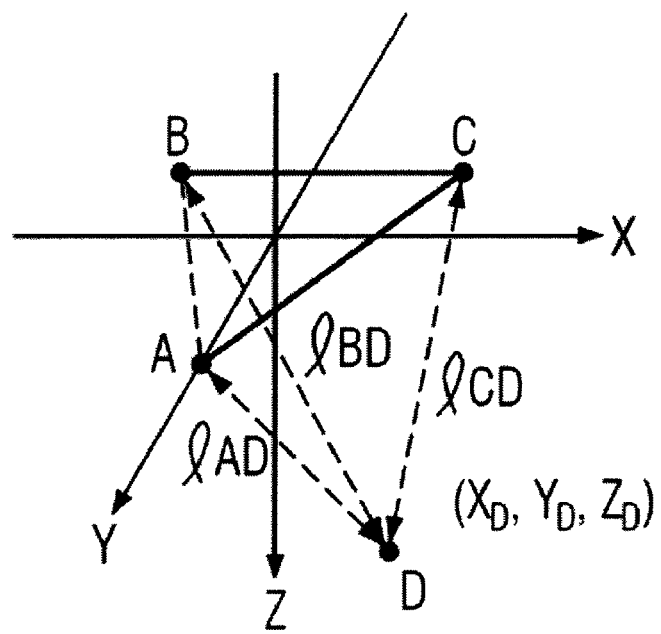
FIG. 13 is a fourth transmitter/detector configuration of a tracking system.

FIG. 13 schematically illustrates a complete determination of the coordinates ($X_D$, $Y_D$, and $Z_D$) of a single detector D. It is assumed that three transmitters A, B, and C are arranged in a fixed triangular arrangement with coordinates of $(X_A, Y_A, \text{and } Z_A)$, $(X_B, Y_B, \text{and } Z_B)$, and $(X_C, Y_C, \text{and } Z_C)$, respectively. If the distances $l_{AD}, l_{BD}, l_{CD}$ are determined by signal transmission time measurements on the basis of a known sound velocity, three geometric equations are available for determining the three unknown coordinates $X_D, Y_D,$ and $Z_D$:

$$(X_D-X_A)^2+(Y_D-Y_A)^2+(Z_D-Z_A)^2=l_{AD}^2$$

$$(X_D-X_B)^2+(Y_D-Y_B)^2+(Z_D-Z_B)^2=l_{BD}^2$$

$$(X_D-X_C)^2+(Y_D-Y_C)^2+(Z_D-Z_C)^2=l_{CD}^2$$

If the tracking system comprises two additional detectors E and F (not shown for simplicity), such that detectors D, E, and F form a fixed triangular arrangement with respect to each other, then equivalent equations are also valid for the coordinates of the additional detectors E and F. In total, nine equations and nine transmission time measurements are possible. However, as described above with reference to FIG. 6, a fixed triangular arrangement has only six degrees of freedom of motion, such that only six of the unknown coordinates may be changed independently, while the other coordinates are predetermined by the geometry of the triangular detector arrangement. Therefore, the tracking system has additional information available for use to determine the actual velocity of sound.

The tracking system may determine at least an orientation of a moveable object. The tracking system may determine the orientation of the moveable object based on detection signal transmission time measurements between a transmitter and detector. As a detection signal, the tracking system employs sonic signals that are non-audible in view of having a sound level below the threshold of hearing. Depending on the particular circumstances of implementation, the threshold of hearing may be the absolute threshold of hearing or a masked threshold of hearing. The tracking system may be used in the environment of an audio system, such as a vehicle entertainment and information system. In this environment, the tracking system is able to make use of existing components of the audio system, such as loudspeakers. The hardware for generating and processing sonic signals may already be available in most audio systems. When the tracking system is applied to a headphone unit used to simulate a surround sound reproduction of audio data, the tracking functionality may improve simulation of surround sound via the headphone unit.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A tracking system, comprising:
a signal generator configured to generate a detection signal, where the detection signal comprises a non-audible sonic signal in an audible frequency range;
a transmitting device configured to transmit the detection signal generated by the signal generator;
a detection device configured to detect the detection signal transmitted by the transmitting device, where either the transmitting device or the detection device is fixed to a headphone unit configured to simulate a surround sound reproduction of audio data, and the other one of the transmitting device and the detection device is located at a fixed position; and
a processing unit configured to determine at least one orientation parameter of the headphone unit based on a transmission time measurement of the detection signal between the transmitting device and the detection device.

2. The tracking system of claim 1, where the processing unit is configured to determine at least one position parameter of the headphone unit based on a transmission time measurement between the transmitting device and the detection device.

3. The tracking system of claim 1, where the transmitting device comprises a loudspeaker.

4. The tracking system of claim 3, where the loudspeaker is configured to transmit the detection signal contemporaneously with an audible sonic signal, where the detection signal is non-audible due to masking by the audible sonic signal transmitted by the loudspeaker.

5. The tracking system of claim 4, where an amplifier is configured to feed the loudspeaker to transmit the audible sonic signal, where the signal generator is configured to determine a masked threshold of hearing on the basis of output information from the amplifier in order to generate the detection signal at a level to be masked by the audible sonic signal.

6. The tracking system of claim 1, where the detection device comprises a microphone.

7. The tracking system of claim 1, further comprising an additional transmitter or detector configured to determine a current sound velocity value.

8. The tracking system of claim 7, where the transmitting device comprises three transmitters forming a predetermined triangular arrangement, where the detection device comprises three detectors forming a predetermined triangular arrangement, where the processing unit is configured to determine the current sound velocity value and to completely determine orientation and position of the headphone unit on the basis of transmission time measurements between the transmitters and detectors.

9. The tracking system of claim 1, where the processing unit is configured to determine a single orientation parameter of a head wearing the headphone unit, where the single orientation parameter comprises a rotation angle around a vertical axis of the head.

10. The tracking system of claim 1, where the detection signal comprises a sonic signal below an absolute threshold of hearing in the frequency range between about 20 Hz and about 16 kHz.

11. The tracking system of claim 10, where the detection signal comprises a sonic signal below the absolute threshold of hearing in the frequency range between about 100 Hz and about 1 kHz.

12. The tracking system of claim 10, where the detection signal comprises a sonic signal below the absolute threshold of hearing in the frequency range above about 10 kHz.

13. The tracking system of claim 1, further comprising a masking determination unit, where the detection signal is masked by other sonic signals, where the masking determination unit is configured to determine a masked threshold of hearing for the detection signal on the basis of a detection of the other sonic signals.

14. The tracking system of claim 13, where the masking determination unit is configured to select a sound level or frequency for the detection signal on the basis of the determined masked threshold of hearing.

15. The tracking system of claim 1, where the processing unit is configured to set at least one characteristic of the audio data for the headphone unit based on the at least one orientation parameter of the headphone unit.

16. The tracking system of claim 1, where the processing unit is configured to modify at least one characteristic of the audio data to correspond to a detected change in the at least one orientation parameter of the headphone unit.

17. The tracking system of claim 16, where the headphone unit is configured to receive the audio data and produce a surround sound reproduction of the audio data for a wearer of the headphone unit, where the surround sound reproduction includes at least one virtual sound source;
where the processing unit is configured to modify the at least one characteristic of the audio data so that the surround sound reproduction at the headphone unit represents a corresponding change to a listener's spatial orientation relative to the virtual sound source.

18. The tracking system of claim 1, where the transmitting device comprises a loudspeaker within a vehicle, where the processing unit is configured to modify at least one characteristic of content provided by an entertainment or information unit of the vehicle for the headphone unit based on a detected change in the at least one orientation parameter of the headphone unit.

19. A tracking system, comprising:
a transmitting device configured to transmit a non-audible sonic signal in an audible frequency range;
a detection device configured to detect the non-audible sonic signal, where the transmitting device or the detection device is associated with a headphone unit configured to receive audio data and produce a surround sound reproduction of the audio data for a wearer of the headphone unit; and
a processing unit configured to determine an orientation or position of the headphone unit based on a transmission time measurement of the non-audible sonic signal between the transmitting device and the detection device, where the processing unit is configured to set at least one characteristic of the audio data for the headphone unit based on the orientation or position of the headphone unit.

20. A method, comprising to acts of:
generating a detection signal, where the detection signal comprises a non-audible sonic signal in an audible frequency range;
transmitting the detection signal;
detecting the detection signal, where transmission or detection of the detection signal occurs at a headphone unit configured to simulate a surround sound reproduction of audio data; and
determining at least one orientation parameter of the headphone unit based on a time measurement between the transmission and detection of the detection signal.

21. The method of claim 20, where the act of transmitting comprises masking the detection signal through transmission of the detection signal contemporaneously with an audible sonic signal, where the detection signal is non-audible due to masking by the audible sonic signal.

22. The method of claim 20, where the act of determining comprises:
determining a current sound velocity value; and
determining the orientation parameter of the headphone unit on the basis of the time measurement and the current sound velocity value.

23. The method of claim 20, where the act of generating comprises:
determining a masked threshold of hearing for the detection signal based on a detection of audible sonic signals or based on information from an amplifier that outputs audible sonic signals; and
selecting a sound level and/or frequency of the detection signal based on the determined masked threshold of hearing.

24. The method of claim 20, further comprising the act of:
setting at least one characteristic of the audio data for the headphone unit based on the at least one orientation parameter of the headphone unit.

25. The method of claim 20, further comprising the acts of:
determining that a change occurred in the at least one orientation parameter of the headphone unit; and
modifying at least one characteristic of the audio data for the headphone unit to correspond to the change in the at least one orientation parameter of the headphone unit.

* * * * *

UNITED STATES PATENT AND TRADEMARK OFFICE
CERTIFICATE OF CORRECTION

| | | |
|---|---|---|
| PATENT NO. | : 8,121,319 B2 | Page 1 of 1 |
| APPLICATION NO. | : 12/013943 | |
| DATED | : February 21, 2012 | |
| INVENTOR(S) | : Azizi et al. | |

It is certified that error appears in the above-identified patent and that said Letters Patent is hereby corrected as shown below:

At column 4, line 16, "...a quite environment..." should be changed to -- a quiet environment --

At column 7, line 42, "...each of the three transmitters to each of the three detectors..." should be changed to -- each of the three transmitters 712, 714, and 716 to each of the three detectors 720, 722, and 724 --

At column 7, lines 44-45, "...the processing unit may..." should be changed to -- the processing unit 710 may --

At column 9, line 15, "...headphone unit 710..." should be changed to -- headphone unit 704 --

At column 9, line 18, "...headphone unit 710..." should be changed to -- headphone unit 704 --

At column 9, line 62, "...the head of the person..." should be changed to -- the head 600 of the person --

At column 10, lines 5-6, "...the headphone unit and..." should be changed to -- the headphone unit 704 and --

At column 10, line 44, "...of FIG. 6. Also..." should be changed to -- of FIG. 11. Also --

Signed and Sealed this
Twenty-ninth Day of January, 2013

David J. Kappos
*Director of the United States Patent and Trademark Office*